Patented July 22, 1930

1,771,169

UNITED STATES PATENT OFFICE

ALFRED CHARLES EGERTON, OF OXFORD, ENGLAND, ASSIGNOR TO ASIATIC PETROLEUM COMPANY, LIMITED, OF LONDON, ENGLAND

NONKNOCKING MOTOR FUEL

No Drawing. Application filed June 6, 1927, Serial No. 197,004, and in Great Britain July 29, 1926.

This invention relates to means for preventing pinking or knock in internal combustion engines.

According to this invention pinking or knock is obviated or reduced by the presence of thallium vapour or the vapour of a thallium compound in the engine cylinder.

The introduction of the vapour into the cylinder may be effected by various methods. By one method a thallium compound soluble in the fuel is injected into the cylinder in solution in the fuel where it becomes vaporized by the heat. Particularly suitable compounds for this purpose are thallium benzylate, thallium phenylethylate, thallium oleate, thallium amyl alcoholate, and thallium ethyl acetoacetate, as these bodies are soluble in petroleum fractions. A suitable proportion of thallium compound to add to the fuel is about 2 grams to one litre of the fuel.

Or again, the metal or a compound of thallium insoluble therein may be suspended in the fuel.

What I claim is:

1. A volatile fuel for internal combustion engines having a volatile thallium salt of an organic acid dissolved therein.

2. A volatile fuel for internal combustion engines having a volatile thallium salt of an organic acid dissolved therein in the proportion of about 2 grams of said thallium salt to 1 litre of said fuel.

In testimony that I claim the foregoing as my invention I have signed my name this twelfth day of May, 1927.

ALFRED CHARLES EGERTON.